United States Patent Office 3,358,836
Patented Dec. 19, 1967

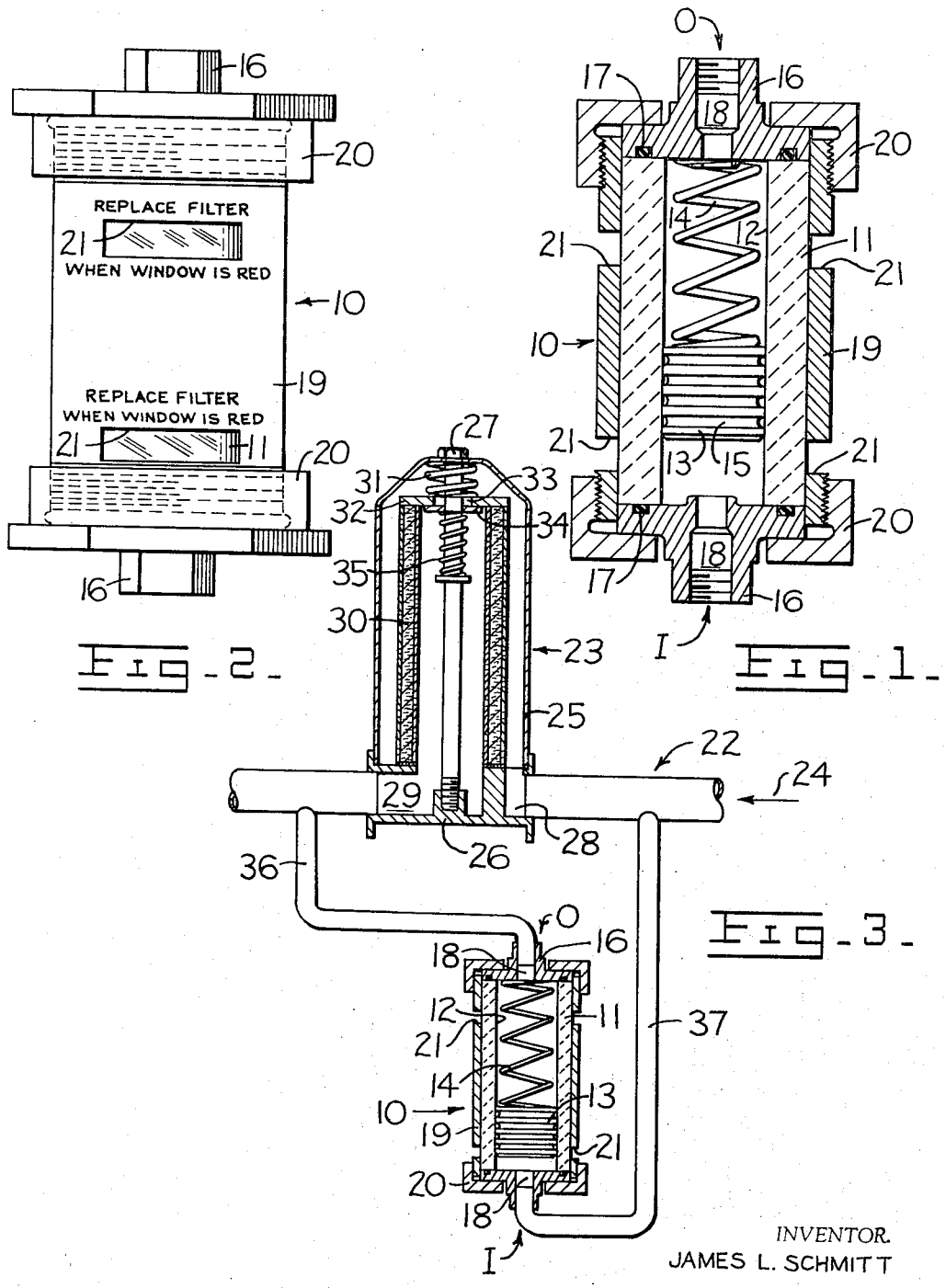

3,358,836
FILTER ELEMENT INDICATOR
James L. Schmitt, Washington, Ill., assignor to Caterpillar Tractor Co., Peoria, Ill., a corporation of California
Filed Apr. 20, 1966, Ser. No. 543,962
5 Claims. (Cl. 210—90)

This invention relates to indicators for fluid filters, and more particularly, to a dual reading visual indicator which will show if the filter element is becoming so overburdened with filtered material that it should be replaced, or if the filter element is not functioning properly because of a rupture or an open bypass valve.

One of the principal difficulties encountered in using fluid filter elements in lubricating or hydraulic oil circuits is that of determining if the filter element is functioning properly. In some cases the filter element may have become so coated and clogged that it is no longer filtering, and in other cases the filter itself may have suffered a rupture, in which case no filtering is occurring. Since these filter elements are employed to remove foreign particles in oil, as well as fragments of metal, it is very important for the proper service life of the circuit that these materials be removed by the filter element. Either a ruptured filter or a clogged filter will result in the by-passing of foreign solid particles which thereafter may enter the circuit via the pump and cause considerable damage. This type of damage is what the filter is designed to protect against.

In the past, filter elements have been changed generally on an hourly use basis, and the persons operating circuits having such filters had no way of knowing whether the filter had become plugged or ruptured during the period or interval of established service life. Often this inability to determine the proper functioning of the filter has caused considerable damage to components within the hydraulic circuit where the filter element has malfunctioned.

Some filter indicating devices have been developed which indicate the degree of clogging of the filter. However, if a filter ruptures, such indicators will show a non-clogged condition, and the operator will not know that the oil passing through the filter element is not cleansed of solid particles since an unclogged filter element and a ruptured filter element are both read the same by the indicator. Since either a clogged filter element or a ruptured filter element may result in the passage of foreign solid particles which can cause excessive wear in the circuit components, it is desirable to have an indicator which shows the true condition of the filter element at all times. This is especially important on vehicles which are used in the field where environmental operations may substantially vary the service life of the filter element.

Accordingly, it is an object of the present invention to provide a filter condition indicator which continuously indicates the condition of the filter element and gives a visual indication if a clogged or a ruptured condition has occurred.

It is also an object to provide a cheap, inexpensive filter condition indicator which can be easily incorporated with a filter unit in a fluid circuit.

Further and more specific objects and advantages of the invention will be apparent in the following description and all of the objects can be accomplished by the combination of a fluid circuit having a replaceable filter element incorporated therein which has an inlet and an outlet, and a dual reading filter condition indicator capable of indicating either a clogged or a ruptured filter element which comprises a body having a passage therethrough and transparent portions at opposite ends of said body through which the end portions of said passage may be viewed, a plunger reciprocally disposed in said passage and sealing portions of said passage on opposite sides of the plunger from one another, spring means supported in one end of the passage and bearing on the plunger with sufficient force to urge the plunger means to the opposite end of the passage, conduit means connecting the portion of the passage containing the spring means with said outlet of said filter element, and second conduit means connecting the opposite end of the passage with the inlet of the filter element whereby the differential of the pressure across the filter element will centrally locate said plunger means within said passage when said filter element is working properly, but which will allow the plunger means to move the opposite ends of the passage when there is a filter element malfunction.

The invention will be better understood by reference to the accompanying drawings wherein:

FIG. 1 is a section of the novel, dual indicating device of this invention;

FIG. 2 is an elevation of the novel indicator shown in FIG. 1, and;

FIG. 3 shows the combination of the novel indicator coupled with a filter incorporated in a hydraulic circuit.

Construction of a preferred embodiment of the novel indicator 10 can be seen in FIG. 1. Basically, a cylindrical, transparent body 11 having a central bore 12, a plunger 13 disposed in the bore and a spring 14 are the principal parts of the indicator. The plunger is disposed reciprocally in the bore and may contain several grooves 15 to reduce friction between it and the bore. The spring is also inserted in the bore and has one end bearing on the plunger.

The opposite ends of the transparent body 11 are closed with end plates 16 compressing seals 17 between their respective interfaces and the respective ends of the body. Both end plates 16 have inlet passages 18 therethrough which lead to the bore 12 in the cylindrical body 11, and spring 14 having one end bearing on plunger 13 has its opposite end bearing on the inboard face of one of the end plates. Through this arrangement the spring can force the plunger to the opposite end of the bore when no fluid pressures are being exerted on the plunger.

For convenience, one end of the indicator has been designated as the O end, meaning that its passage inlet 18 is connected to the filter outlet, and the other end has been designated as the I end, meaning its inlet passage is connected to the filter inlet. Note that the spring 14 is located in the bore in the O end of the indicator. This is important since the indicator uses the differential pressure developed across the filter element, and the inlet pressure is balanced by the outlet and spring pressures when the filter element is operating properly as will be more fully explained hereinafter.

The above assembly is held together by a sleeve 19 which is threaded at each end and which fits snugly over the cylindrical body 11 and cooperating apertured caps 20 which fit over the central structural portions of the end plates 16, and are screwed onto the respective ends of the sleeve compressing the end plates on the ends of the cylindrical body in sealing engagement. The sleeve is apertured adjacent to each end to provide a window 21 through which bore 12 of the transparent body can be observed. Also, the outside of the sleeve may contain the appropriate instructions relative to filter operation as is shown in FIG. 2. In that embodiment of the invention the plunger 13 is colored red, so that red will show in the window if the plunger moves through the bore into the areas of the windows indicating a malfunction of the filter element.

Actually, the transparent body can be of a variety of shapes and of sectioned parts so that only the end portions thereof are transparent. Glass or plastic is satisfactory for fabricating the body and the sleeve 19 can be made to receive the body snugly so that it provides structural support against pressure deformation of the body. Further, the indicator can be made in a variety of ways and designs which incorporate the basic spirit of the invention.

FIG. 3 shows an indicator as would be used in combination with a filter in a hydraulic circuit 22 in which only the filter 23 and a small section of the circuit are shown. An arrow 24 represents the direction of fluid flow through the circuit. Basically, the filter is composed of a housing 25 which is held on a base 26 by a bolt 27. The base has an inlet 28 and an outlet 29 so that fluid travels from the inlet into the housing which contains a replaceable cylindrical filter element or cartridge 30, through the element or the cartridge and out of the filter through the outlet. Spring 31 holds the filter element or cartridge in place within the filter pressing on plate 32, and an aperture 33 in the plate closes with bypass valve 34 biased by spring 35 and provides a pressure relief valve if the filter clogs and the pressure within the housing builds to that which would rupture the filter. This filter element is of a common, commercial type.

As can be seen in FIG. 3, the O end of the indicator is connected through conduit 36 to the outlet 29 of the filter and the I end is connected to the inlet 28 of the filter through conduit 37.

With a brand new filter element 30 in the filter 23, the differential pressure across the filter element will cause plunger 13 to move into position between the upper and lower windows 21. As the filter becomes clogged the differential pressure will increase until the plunger is visible in the upper window (adjacent to the O end of the indicator), indicating a filter element change is required. Alternatively, if the bypass valve 34 sticks in the open position, or if the filter element ruptures, the plunger will appear in the lower window being forced down by the urging of spring 14 indicating a filter change is necessary, or a malfunction of the filter assembly.

Thus, through the use of this novel indicator it is possible to visually indicate a clogged filter element, or alternatively a ruptured or malfunctioning filter element. Since this simple indicator can be made inexpensively and is of a rugged design, it lends itself well to incorporation in vehicles used in the field. Further, each filter element in the circuit can be accompanied by its own indicator, thereby providing a quick reference to the operator of the condition of the filters. Not only can the operator save the expense of replacing the filters needlessly, but he can also avoid damage that can result from a ruptured filter element, or filter through which bypassing across the bypass valve is occurring. Because of these factors the novel indicator is of considerable importance in vehicles which have a large number of filter elements where they facilitate a rapid check of filter condition by visual observation. These types of indicators are basically GO NO-GO type indicators and eliminate the necessity of the operator memorizing various pressure ranges and the like he must know for other types of indicators of filter element condition.

What is claimed is:

1. In combination with a fluid circuit containing a replaceable filter element disposed in a filter with an inlet and outlet, a dual reading filter condition indicator capable of indicating either a clogged or ruptured filter element comprising:
    (a) a body having a passage therethrough, said body having transparent end portions through which said passage can be visually observed;
    (b) a plunger means disposed reciprocally in said passage and sealing portions of said passage on opposite sides of said plunger means from one another;
    (c) spring means supported at one end of said body within said passage and bearing on said plunger means and having sufficient extension to push said plunger means to the opposite end of said passage;
    (d) conduit means connecting the portion of said passage containing said spring means with said outlet of said filter; and
    (e) second conduit means connecting the portion of such passage free of said spring means with said inlet of said filter whereby a differential pressure across the filter element will centrally position said plunger in said passage until said filter element is clogged or ruptured which will cause said plunger means to move into one or the other warning areas at opposite ends of said indicator.

2. The combination as defined in claim 1 wherein the passage of the body is a cylindrical bore.

3. The combination as defined in claim 1 wherein the plunger means in the indicator is colored for higher visual perception.

4. The combination as defined in claim 3 wherein the body is encased in a sleeve having window openings in warning areas through which the plunger means is visible when there is a filter malfunction.

5. The combination as defined in claim 4 wherein the body is a transparent cylinder.

No references cited.

SAMIH N. ZAHARNA, *Primary Examiner.*